United States Patent [19]

LaBiche et al.

[11] Patent Number: 4,839,838
[45] Date of Patent: Jun. 13, 1989

[54] SPATIAL INPUT APPARATUS

[76] Inventors: Mitchell LaBiche, 307 Pecan Grove Rd. #3, Scott, La. 70583; Alvin Derouen, 1600 Hopkins St., New Iberia, La. 70560

[21] Appl. No.: 32,305
[22] Filed: Mar. 30, 1987
[51] Int. Cl.⁴ .............................................. G06F 3/033
[52] U.S. Cl. .................................................. 364/709.11
[58] Field of Search .............. 364/709, 709.01, 709.11; 340/709, 710; 73/493, 505, 510, 517 R

[56] References Cited

U.S. PATENT DOCUMENTS

| | | | |
|---|---|---|---|
| 2,996,268 | 8/1961 | Brown et al. | 244/14 |
| 3,597,598 | 8/1971 | McAllister et al. | 73/178 |
| 3,729,129 | 4/1973 | Fletcher et al. | 235/10.2 |
| 4,038,876 | 8/1977 | Morris | 73/510 |
| 4,151,596 | 4/1979 | Howells | 364/709 |
| 4,315,693 | 2/1982 | Walker | 73/517 R |
| 4,398,417 | 8/1983 | Shutt | 73/514 |
| 4,420,577 | 12/1983 | Elleman et al. | 73/505 |
| 4,445,376 | 5/1984 | Merhav | 73/510 |
| 4,506,336 | 3/1985 | Hird | 364/518 |
| 4,510,802 | 4/1985 | Peters | 73/510 |
| 4,516,427 | 5/1985 | Carey | 73/505 |
| 4,563,740 | 1/1986 | Blake et al. | 364/414 |
| 4,566,328 | 1/1986 | Bernard et al. | 73/517 B |
| 4,573,356 | 3/1986 | Barmatz | 73/505 |
| 4,578,674 | 3/1986 | Baker et al. | 340/710 |
| 4,590,801 | 5/1986 | Merhav | 73/510 |
| 4,592,233 | 6/1986 | Peters | 73/510 |
| 4,592,235 | 6/1986 | Fink | 73/517 R |
| 4,598,585 | 7/1986 | Boxenhorn | 73/505 |
| 4,601,206 | 7/1986 | Watson | 73/514 |
| 4,608,641 | 8/1986 | Snell | 364/434 |
| 4,711,125 | 12/1987 | Morrison | 73/510 |
| 4,712,426 | 12/1987 | Peters | 73/505 |
| 4,736,191 | 4/1988 | Matzke et al. | 340/710 |

OTHER PUBLICATIONS

W. Neuman & R. Sproull, Principles of Interactive Computer Graphics, pp. 147–157 (1979).
Interactive Computer Graphics Systems, Petrocelli Books Inc., p. 169 (1982).
McDonnell Douglas, 3 SPACE product literature.
Sundstrand Data Control, Inc. QA-700 & QA-2000 Servo Accelerometer product and application literature.

Primary Examiner—Gary V. Harkcom
Assistant Examiner—Dale M. Shaw
Attorney, Agent, or Firm—Pravel, Gambrell, Hewitt, Kimball & Krieger

[57] ABSTRACT

A three-dimensional spatial input apparatus including a series of coplanar, single axis accelerometers configured to provide information on translation along and rotation around a set of orthogonal axes. A preprocessing computer determines the acceleration values output by the accelerometers and converts these values into a series of acceleration, velocity and position values in relation to the axis system, with corrections based on a change in the influence of gravity on the device as it rotates. The values are transmitted to an object control computer which takes appropriate action, including moving a cursor, rotating a displayed object, and controlling remote devices. The spatial input apparatus can have an attached pointer and be used as a three-dimensional digitizer in conjunction with the object control computer.

16 Claims, 7 Drawing Sheets

SPATIAL INPUT APPARATUS

BACKGROUND OF THE INVENTION

1. Field of the Invention

The present invention relates to input devices for computer systems and more particularly to input devices indicating position or motion.

2. Description of Prior Art

With the growing computerization of society, the need for a wide variety of input devices has increased. In the past, data and information from the operator has been provided to computer systems through a variety of operator terminal devices such as keypunched card readers and tape readers. More recently interactive alphanumeric keyboards have become the standard means for operators to communicate with computer systems. While the alphanumeric keyboard was adequate for entering textual data, it was of very limited use for moving a point or cursor on a display screen or otherwise represented by the computer in any spatial direction or orientation. To overcome these inherent limitations on keyboard entry devices, a number of graphical input devices such as are known in the industry as "joysticks", "tracker balls" and more recently the "mouse" were developed to permit the entry of spatial orientation data or desired graphical information into a computer. A number of these devices were explained in W. Neuman and R. Sproull, *Principles of Interactive Computer Graphics*, McGraw Hill Co., pp. 147–157 (1979).

As explained in the Neuman and Sproull article, the mouse was rested on a flat surface and moved in the plane defined by the supporting surface as desired. Rotation of wheels located on the bottom of the mouse was interpreted by encoding devices mounted on orthogonal shafts to determine the relative movement of the mouse along each of the orthogonal axes. This movement information was transmitted to the computer for processing. The mouse therefore provided data corresponding to two-dimensional, orthogonal movement, but was limited by the requirement that it be located on a flat surface and could not provide three dimensional movement data such as that corresponding to rotation about a central axis.

U.S. Pat. No. 4,578,674 disclosed a wireless cursor positioning control device which used infrared and ultrasonic signals to determine the direction of motion in the orthogonal directions of the positioning device. The reference indicated without specific details that three dimensional control could be developed using the techniques disclosed. Even assuming a three dimensional control system was developed using these infrared and ultrasonic techniques, any such system would have been limited by the requirement of an unblocked line-of-sight transmission between the positioning device and the control base for transmission of the infrared and ultrasonic signals. This greatly limited the feasibility of infrared and ultrasonic systems for use in a 3-dimensional rotational situation and in a number of other 3-dimensional translational situations.

The Neuman and Sproull reference discussed tablet devices which were useful in digitizing material for input into a computer system. In tablet devices a digitizing surface was used in conjunction with a cross hair or cursor which could be moved to a desired position on the tablet surface. A switch was mounted to enable the operator to input data corresponding to the instantaneous position of the cross hair device on the tablet as a key point for use by the computer. These digitizing tablets worked on acoustic or magnetic properties and were limited to 2-dimensional operation. A 3-dimensional version was described in the Neuman and Sproull reference which used three acoustic microphone systems located on the tablet and one speaker system located in a pen. The system was limited to indicating only translational position and not the various rotational positions of the input device. A variant on this device used ultrasonic transmitters placed around the table and a microphone located in a pen. This variation had the same rotational limitations.

Mechanical devices were also used to indicate 3-dimensional locations wherein reels mounted at a fixed location were moved to the desired point and the relative motion was computed. These devices had the disadvantage that they were limited to translation values and could not provide rotational indications of the body.

U.S. Pat. No. 4,601,206 showed an inertial platform accelerometer cluster used to develop acceleration signals for directional and angular accelerations about the orthogonal axes.

U.S. Pat. No. 3,597,598 disclosed an accelerometer system employing three accelerometers and three angular error sensors to provide acceleration signals indicative of an alternate coordinate system.

SUMMARY OF THE INVENTION

The present invention provides a spatial input apparatus for a computer system capable of indicating both translational movement and rotational movement of the input device. The invention provides acceleration, velocity, and translational indications for all six different degrees of freedom. The apparatus of the present invention determines the acceleration due to gravity on the device and compensates for this background signal. The apparatus includes a series of at least six accelerometers located in a single plane such that three accelerometers are used to provide indications of three of the degrees of freedom, for example, X and Y axis translations and Z axis rotation, and the other three accelerometers provide information regarding the remaining three degrees of freedom, for example, Z axis translation and X and Y axis rotations. The accelerometers are located in a coplanar configuration to reduce the physical size requirements and to facilitate grasping the apparatus by hand.

A movable portion of the apparatus includes a push button switch to be used as desired for the computer system. The movable portion can either be in a wired configuration or in a wireless design as desired to enable communication with the computer system or portions of the processing circuitry.

When the input apparatus is connected to a computer system, several uses and alternate modes of operation can be provided depending upon the particular configuration employed. The apparatus can be configured for use on a flat surface by including a switch to provide two dimensional information relating to X and Y translation and rotations about the Z axis. By providing additional interaction between the apparatus and computer system the apparatus can be used for only single axis translation or two dimensional motion in a plane when not resting on a surface. Additionally, a pointer or wand can be included with the apparatus to cooperate with the computer system, to provide a digitizing system referenced to the tip of the pointer.

The apparatus may also be configured to provide a means for rotating and translating the displayed view of a three dimensional object shown on a computer system display device for computer modeling. The apparatus can also be used as the reference system to program the movement of a object which is controlled by the computer system. As set forth in detail herein, the movement of the object or robot arm can be made to mimic the movement of the apparatus. This aspect of the user invention allows the user to be in a different environment than the working environment of the object or allows the user to have extreme strength multiplication or much finer resolution as may be required.

DESCRIPTION OF THE PREFERRED ALTERNATIVE EMBODIMENTS

Figure 1:
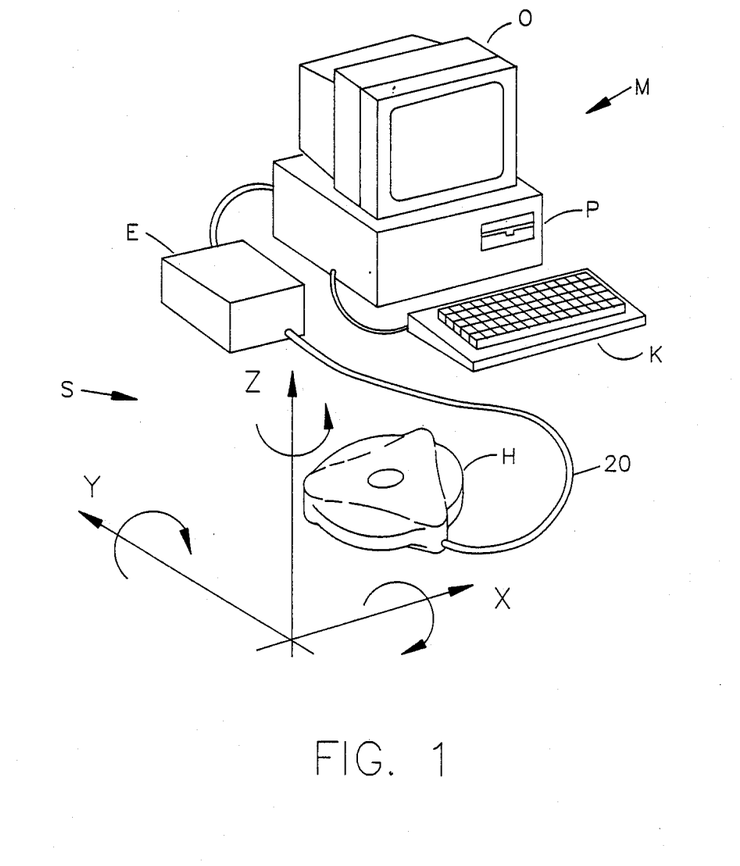
FIG. 1 is a perspective view of a spatial input device according to the present invention connected to a computer system.

In the drawings, the letter S (FIG. 1) designates generally an apparatus embodying the present invention for producing an output indicative of spatial position and movement. The apparatus S has a hand held module H adapted to be gripped by the user and moved as desired and an electronics module E containing the circuitry necessary to connect the apparatus S to a computer M. The computer M includes a processing unit P, a keyboard K, and an output device 0. As shown in FIG. 1, the handheld module H is connected to the electronics module E via a wired connection 20 but it is to be noted that the handheld module H can communicate with the electronics module E by wireless methods such as infrared, radio frequency or ultrasonic systems well known to those skilled in the art.

The handheld module H (FIG. 2) contains a series of six accelerometers A, B, C, A', B' and C' positioned to have each of their centers of measurement in the same plane. The accelerometers are arranged in two sets of three. The accelerometers are single axis devices which produce an output signal only for accelerations along this axis. Accelerometers A, B and C are positioned such that their centers of measurements are located at the corners an equilateral triangle 18 (FIG. 3) and their active axes are coplanar and perpendicular to a line from the vertex to the center of the triangle. Accelerometers A', B', and C', are arranged such that their centers of measurement are located at the vertexes of a second equilateral triangle 16, coplanar with the triangle of the other accelerometer set, and their active axes are perpendicular to the plane. The two equilateral triangles are offset by 60° and have a common central point V, which is the measurement or reference point of the module H.

Figure 2:
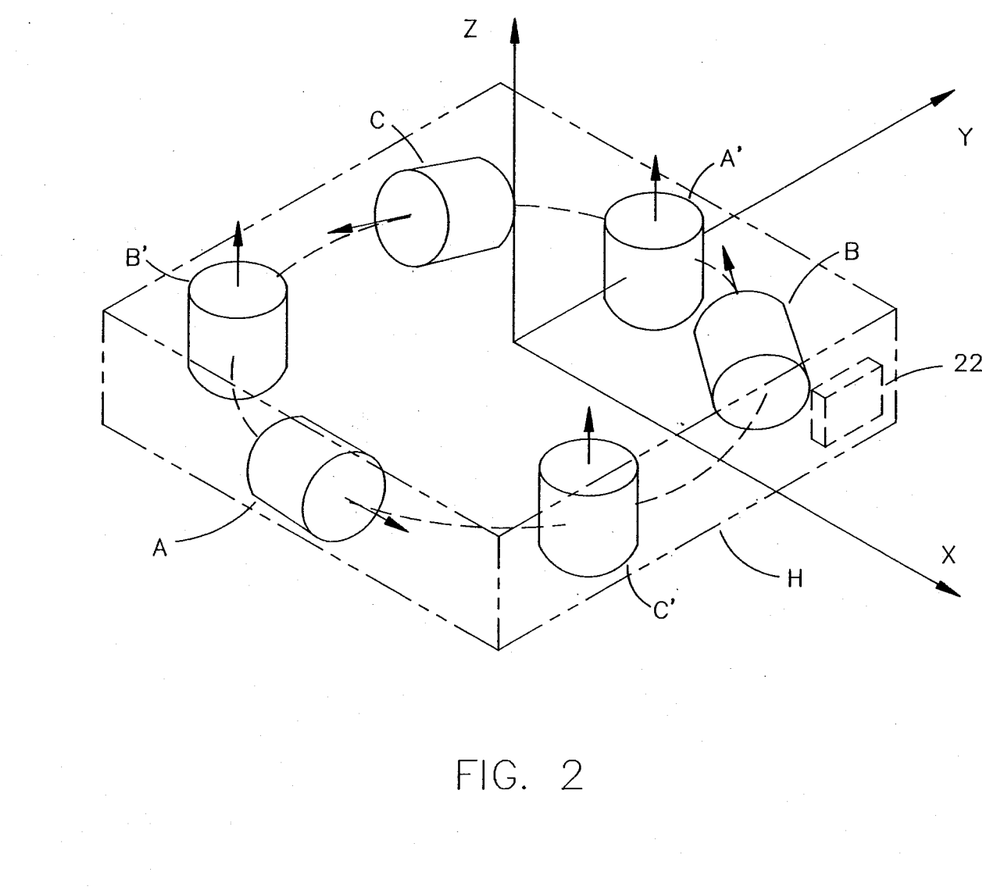
FIG. 2 is a perspective view of a spatial input device according to the present invention.
Figure 4:
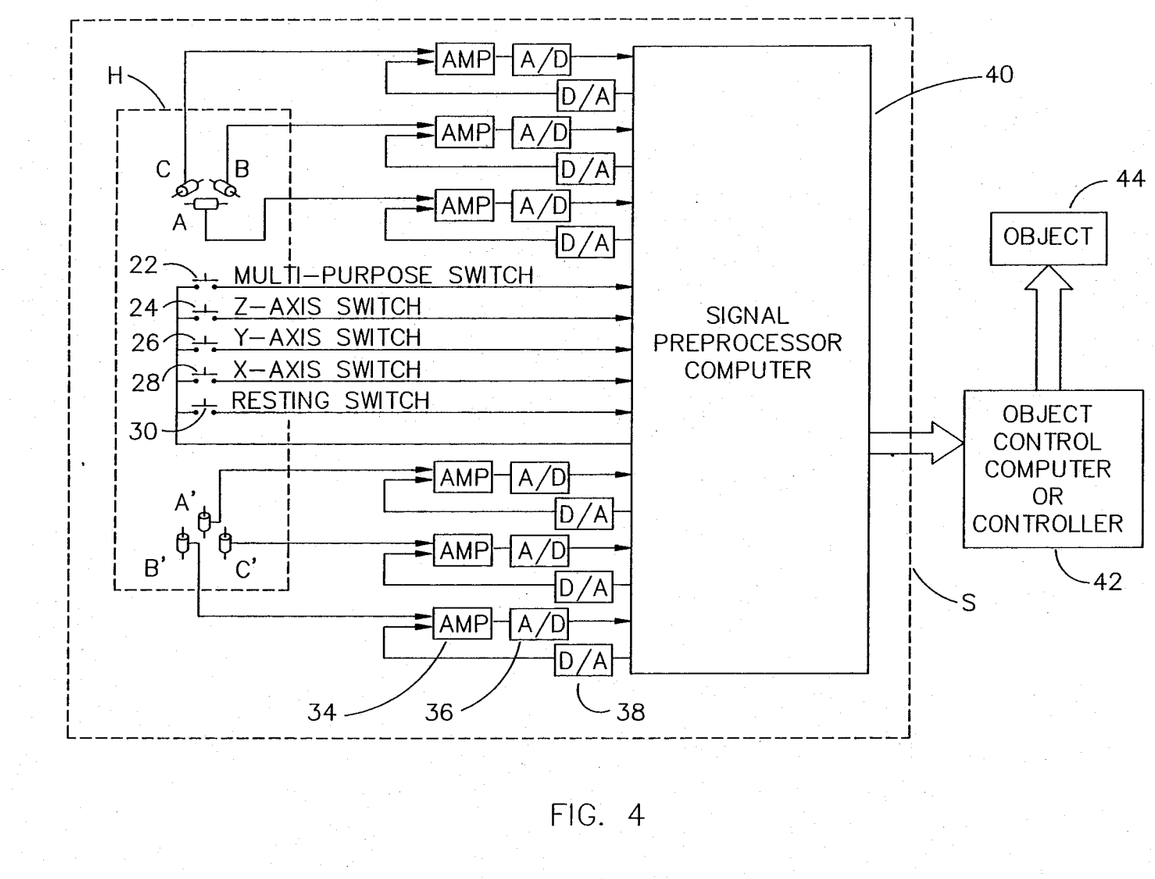
FIG. 4 is a functional block diagram of a spatial input device and system according to the present invention.

The handheld module H has an axis system as shown in FIG. 2 having X, Y, and orthogonal axes. The accelerometers are positioned to have their centers of measurement in the plane defined by the X and Y axes. The Z axis is perpendicular to both the X and the Y axis. The user grips the handheld module H in his hand and moves the module H through space as desired. The accelerometers measure and provide individual output signals indicative of the acceleration of the module H in the respective active directions of each accelerometer. These signals provide the data for which accelerations of the module H along all three orthogonal axes and all three rotational axes can be obtained. Referring now to FIG. 4, module H also includes a switch 22 which can be activated by the user when it is desired to respond to a prompt from the computer system or signal the selection of an instantaneous location of the module H. Additionally, the module H may include switches 24, 26, and 28 (FIG. 4) for other functions related to the operation of the module which can be used for various purposes such as selecting motion only in a single plane or a single axis. A resting position switch 30 may be included in the module H to provide a signal indicative of when the module H is resting on a surface, which signal may then be used to place module H into a mode wherein only X and Y axis translation and Z axis rotations are developed.

The accelerometers are single axis devices, all identical in construction and each having an operating bandwidth extending from zero to several hundred Hertz. In the illustrated embodiment, the accelerometers provide output signal in analog form. With minor changes the apparatus S could be modified to perform similar functions using accelerometers which provide digital format output signals. Low frequency accelerometers are desirable in this application because of the relatively high sensitivities necessary to measure fine responses of the human hand. Accelerometers suitable for these purposes are readily commercially available.

The coplanar construction and the hexagonal arrangement of the accelerometers allows the handheld module H to be a very compact unit which is easily gripped because of the relatively low height profile. This compact arrangement which permits the module H to be comfortably held within the hand and facilitates movement in any direction is one of the significant advantages provided by the present invention.

Figure 3:
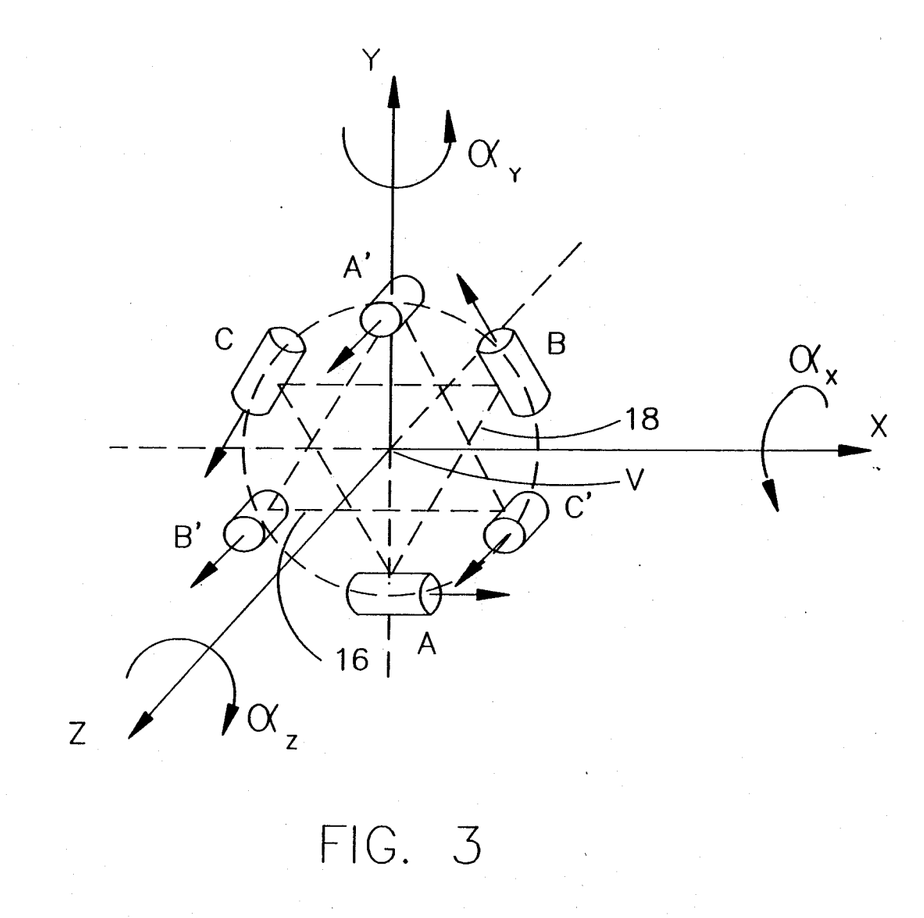
FIG. 3 is a perspective representation of an accelerometer system cluster associated with a spatial input device according to the present invention.

The accelerometers produce a output indicative of the acceleration along their active axis. In FIG. 3, the active axes of the various accelerometers are illustrated along with the axes and rotational systems used in the sixth degrees of freedom provided in the apparatus input S in the preferred embodiment. The orthogonal axes are defined as the X, Y, and Z axes. The rotational variables which relate to each of these orthogonal axes X, Y, and Z are designated, $a_x$, $a_y$ and $a_z$ Based upon the geometrical relationship between the accelerometers and their location relative to the orthogonal axes X, Y, and Z, the accelerations in the three orthogonal directions and the three rotations about each of the three orthogonal axes may be determined. These relationships are set forth in the following equations where $A_x$, $A_y$, $A_z$, $a_x$, $a_y$, and $a_z$, are the linear and rotational accelerations relative to the subscripted axis; A, B, C, A', and C' are the accelerations sensed by the corresponding accelerometer; and r is the distance from the accelerometer center to the common central point V.

$$A_x = \tfrac{2}{3}\{A - [(B+C)/2]\}$$

$$A_y = \tfrac{2}{3}(B-C)\sin 60°$$

$$A_z = (A' + B' + C')/3$$

$$\alpha_x = [A' - 2(B' + C')]/(3r)$$

$$\alpha_y = [(b' - C')/\sin 60°]/(2r)$$

$$\alpha_a = (A + B + C)/(3r)$$

The accelerations indicated above include the affects of gravity on the accelerometers. When there is no movement of the handheld module H, the output from the translational equations equals the acceleration of gravity, so that the $A_x$, $A_y$, $A_z$ values are the direction cosines of the gravity vector. The magnitude of the direction cosines is always less than or equal to one such that the following formula develops the magnitude of gravity where g is the acceleration of gravity.

$$g = \sqrt{A_x^2 + A_y^2 + A_z^2}$$

When in motion the $A_x$, $A_y$, and $A_z$ values are not the direction cosines because of the acceleration provided by the user.

The relationship between the various accelerations can be used to determine the initial orientation of the handheld module H by the following equations where $\theta_{Gy}$, $\theta_{Gz}$, and $\theta_{Gx}$ represent the angle of the accelerometer cluster plane from the referenced axis.

$$\theta_{Gy} = \arctan A_x/A_z$$

$$\theta_{Gz} = \arctan A_y/A_x$$

$$\theta_{Gx} = \arctan A_y/A_z$$

Resolution of these equations provides baseline data from which the determination of the changes in position, accelerations and velocities of the apparatus S can be made, taking into account the effects of the gravitational field of the earth.

As the module H is rotated, the effect of gravity upon each of the various accelerometers changes. Therefore the initial orientation of the handheld module H must be determined in order to calculate the new orientation of the module H. Using the initially developed orientation and the various acceleration signals developed, it is possible to determine the accelerations due to a change in gravity and therefore the accelerations imparted by the user in accordance with the following known relationships, where $A_G$ represents the acceleration due to gravity on the referenced accelerometer, $\Delta\theta$ is the change in angle of the cluster plane from the referenced axis, G is the gravity vector, and D represents the original direction cosine of the gravity vector in the referenced axis as determined based on the last inclination determination. The prime (') angular positions are predicted angles based on current angular positions. These equations are satisfactory because the sampling rate of the unit is sufficient so that the system can be considered as doing infinitesimal rotations, allowing these approximation equations to be used. A preferable sampling rate is in the range from 2 to 10 kHz, but other ranges are acceptable.

If the module is moving, the rotational accelerations are doubly integrated to develop the incremental rotational change of the module H. This rotational change vector is doubled to develop a predicted rotational change or $\Delta\theta'$ of the module. This predicted rotational change vector $\Delta\theta'$ is then crossed into the original gravity direction cosine vector D determined when the module H was last at rest and added to the original direction cosine vector D to develop the predicted gravity vector G'. The dot product of the predicted gravity vector G' is taken with the current translational acceleration vector to develop the predicted magnitudes of gravity on each accelerometer. These accelerometer gravity magnitudes are stored for subtraction from the acceleration values being received from each accelerometer in later processing through the geometrical relationship equations.

$$(G'_x G'_y G'_z) = (D_x D_y D_z) + (\Delta\theta'_x \Delta\theta'_y \Delta\theta'_z) \times (D_x D_y D_z)$$

$$A_{GA} = G'_x$$

$$A_{GB} = -G'_x \sin 30° + G'_y \cos 30°$$

$$A_{GC} = -G'_x \sin 30° - G'_y \cos 30°$$

$$A_{GA',B',C'} = -G'_z$$

Velocities and actual positions are determined by integrating the acceleration signals a first time and a second time. This is done using a stepped approximation method where the acceleration and the time between samples of the accelerometer readings are known. These rotational position values are then used in the gravity vector predictions and calculations to correct for the accelerations due to gravity in any rotational situation. If there is no rotation of the module H, there is no need for a gravity correction calculation because the gravity vectors have not changed.

The output signals from the accelerometers are provided to amplifiers 34 (FIG. 4). These amplifiers 34 are used to perform the gain control and bias shifting necessary to transform the output signals of the accelerometers to the desired scale and range. The output signals of the amplifiers 34 are provided to analog/digital converters 36 which convert the amplifier analog signal to a digital signal for use by the signal preprocessor computer 40. Apparatus S can also include digital/analog converters 38 which are controlled by the signal preprocessor computer 40 and provide an output signal to a second input on the amplifiers 34. In this manner the digital/analog converters 38 are used to bias shift the amplifier output signals by a known amount. In one embodiment it is desired to shift the amplifier output signal by the amount of the gravity vector on that accelerometer. This allows the full scale range of the analog/digital convertors 36 to be set to correspond to a range of plus or minus one-half gravity. This increases the effective accuracy of the analog/digital convertors 36 in relation to those set to provide a plus or minus one and a half gravity output corresponding to full scale.

The accelerometers and the various switches 22–30 are contained in the handheld module H. In an alternative embodiment, the electronic processing circuitry is also contained in the handheld module H to eliminate the need for a second module as in the embodiment shown in FIG. 1.

Figure 5:
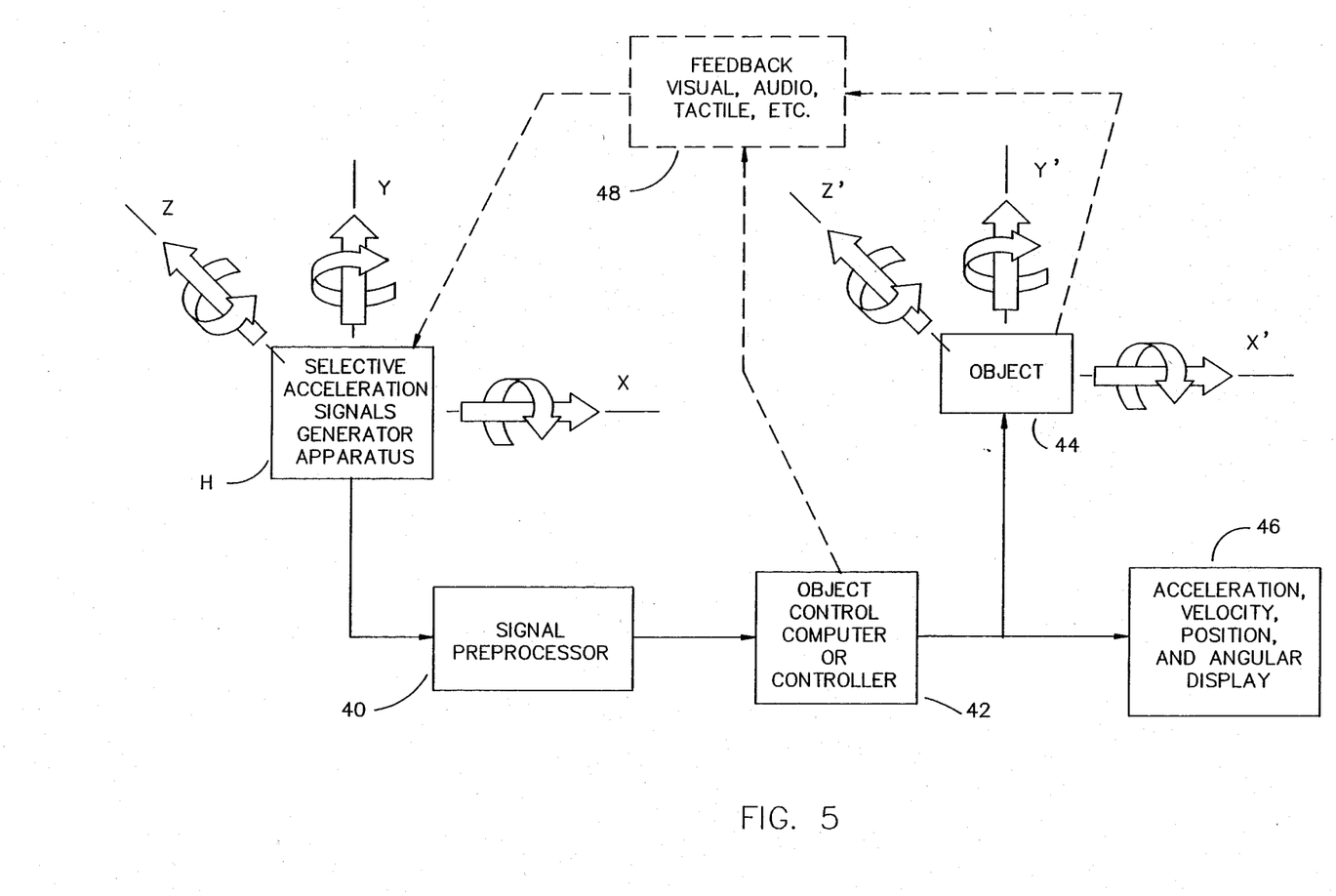
FIG. 5 is a functional block diagram of a system utilizing a positional input device according to the present invention.

The signal preprocessor computer 40 performs the necessary calculations to convert the raw acceleration signals received from the accelerometers into the desired acceleration, velocity and position signals for the six degrees of freedom. These orientation and translation signal values are then transmitted from the signal processor computer 40 to the object control computer 42. Computer 42 may then use these orientation and translation signals to manipulate an object 44 in accordance with the remote instructions of the user provided via the module H. The object control computer 42 may also use these orientation and translation signals to communicate with a display unit 46 (FIG. 5) which displays the acceleration, velocity and position values for both the orthogonal and rotational axes.

The object 44 to be manipulated may be many different things. For example, the object 44 may be a three-dimensional display on a graphical output device. The movement of the handheld module H may be used to control a cursor to cause it to move over the 3-D representation of the object to allow effective visualization of motion in a 3-D surface under computer simulation. By having a cursor display, feedback as indicated in block 48 is developed by the user so that the user can manipulate the handheld module H as desired to cause the cursor to move to the desired location. The use of this three-dimensional representation of a cursor may also be used for various other computer modeling and design purposes. The module H may be used in conjunction with the object control computer 42 to move a displayed 3-D object to match the movements of the module H. This would allow a 3-D simulated object to be rotated and translated to obtain the desired view.

The object may also be a set of remote manipulators or a robot arm. In this embodiment, the end of the arm may be made to respond to movement of the module H. The handheld module H is moved as desired and the object control computer 42 controls the object 44 to mimic the movement of the handheld module H. This allows a user to operate an apparatus where the apparatus is in a hostile or undesirable environment and yet the user is located in a safe environment. As an alternative, the scale factor of the movements of the handheld module H can be multiplied or divided by an appropriate scale factor to allow either gross manipulation of an object or very fine detail work necessary in many areas. This allows the user to do comfortable motions which are well within his capabilities and yet control very delicate or very large objects with a high degree of accuracy.

Figure 6:
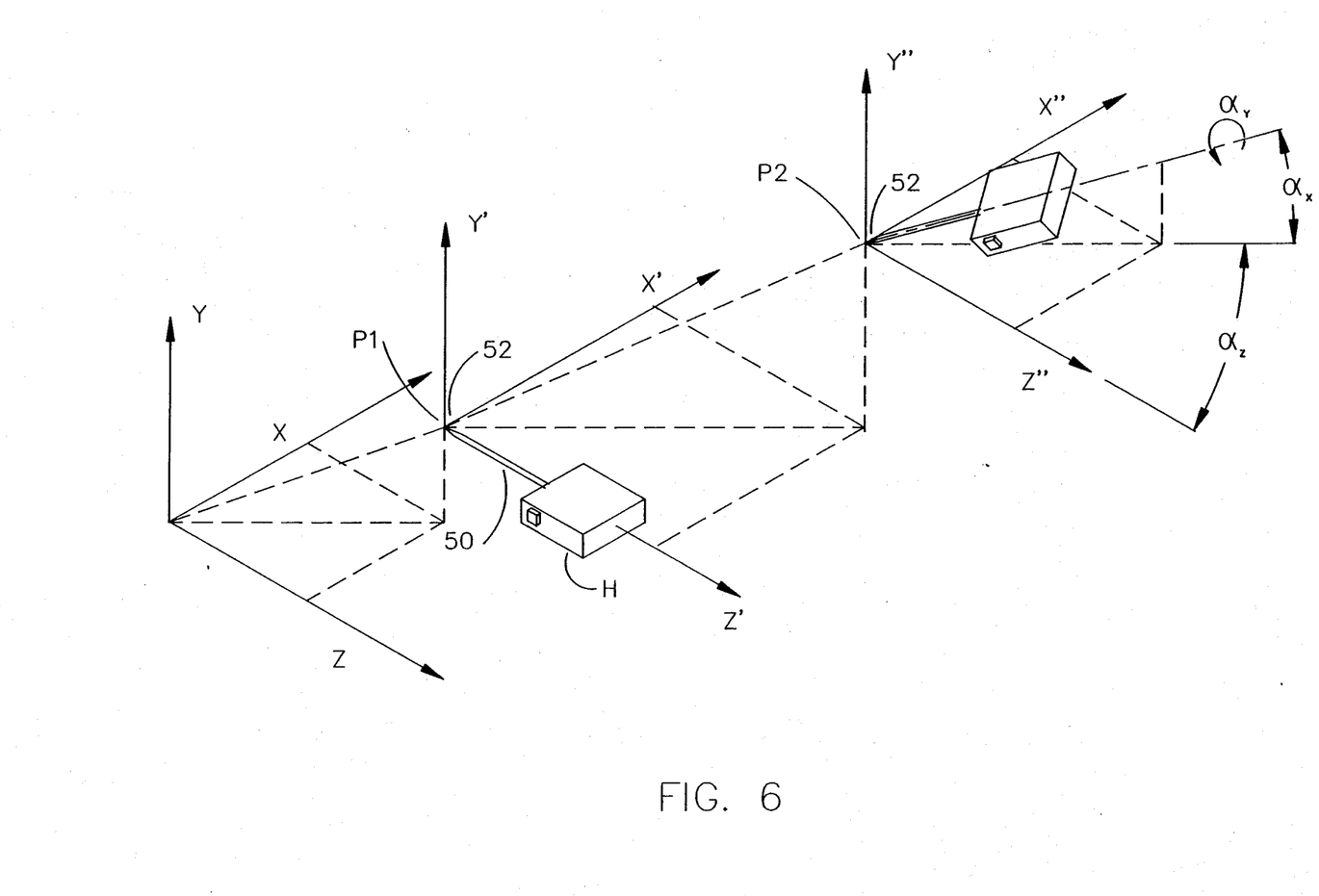
FIG. 6 is a perspective illustration of a spatial input device including a pointer according to the present invention.

The apparatus S may also be used as a three-dimensional digitizer. To provide this function, a pointer 50 (FIG. 6) is attached to the handheld module H and the point or tip 52 of the pointer 50 is spatially identified. The tip 52 of the pointer 50 is located by placing the tip 52 in a fixed location and having the user rotate the handheld module H about this fixed point. In performing this motion, the handheld module H forms an approximately spherical surface. Selecting four points on this spherical surface, each having different gravity vectors, for reference purposes allows the object control computer 42 to determine the location of the tip 52 for later reference calculations. Once the tip location is accurately determined with relation to the center of the handheld module H, the digitizing process can begin. The tip 52 is moved to the desired first point of data entry, at which time switch 22 is depressed. This closure of the switch 22 is used to cause the object control computer 42 to take a snapshot of the location of the handheld unit H at a given instant and perform the necessary calculations to calculate the exact location of the tip 52. By repeatedly performing this step, the three dimensional surface of an object can be digitized for computer aided modeling and manufacturing purposes.

The spatial input device S can also be used as a two dimensional digitizer. The pointer 50 is replaced with a standard crosshair fixture (not shown) and the calculation of the reference point is performed by rotating the module H about a point.

The control program necessary to accomplish the calculations described above is schematically illustrated in FIG. 7. When the apparatus S is first activated control of preprocessing computer 40 resides at step 100 which causes the apparatus S to initialize various variables and data communication ports, etc. After completing the initialization step 100, control transfers to step 102 where the preprocessing computer 40 determines the gravity force vectors used to properly determine the actual acceleration due to the user and not from a change in the gravity vectors. Additionally, step 102 which causes the preprocessing computer 40 to determine the orientation of the handheld module H. After determining the gravity force vectors and inclination in step 102, the preprocessing computer 40 obtains new acceleration signals in step 104 by reading the analog/digital converters 36 and incorporating the digital/analog convertor 38 bias shift. These acceleration signals are evaluated in step 106. If there was no movement of the handheld module H, control returns to step 102 for recalculation of new gravity vectors and inclination.

Figure 7:
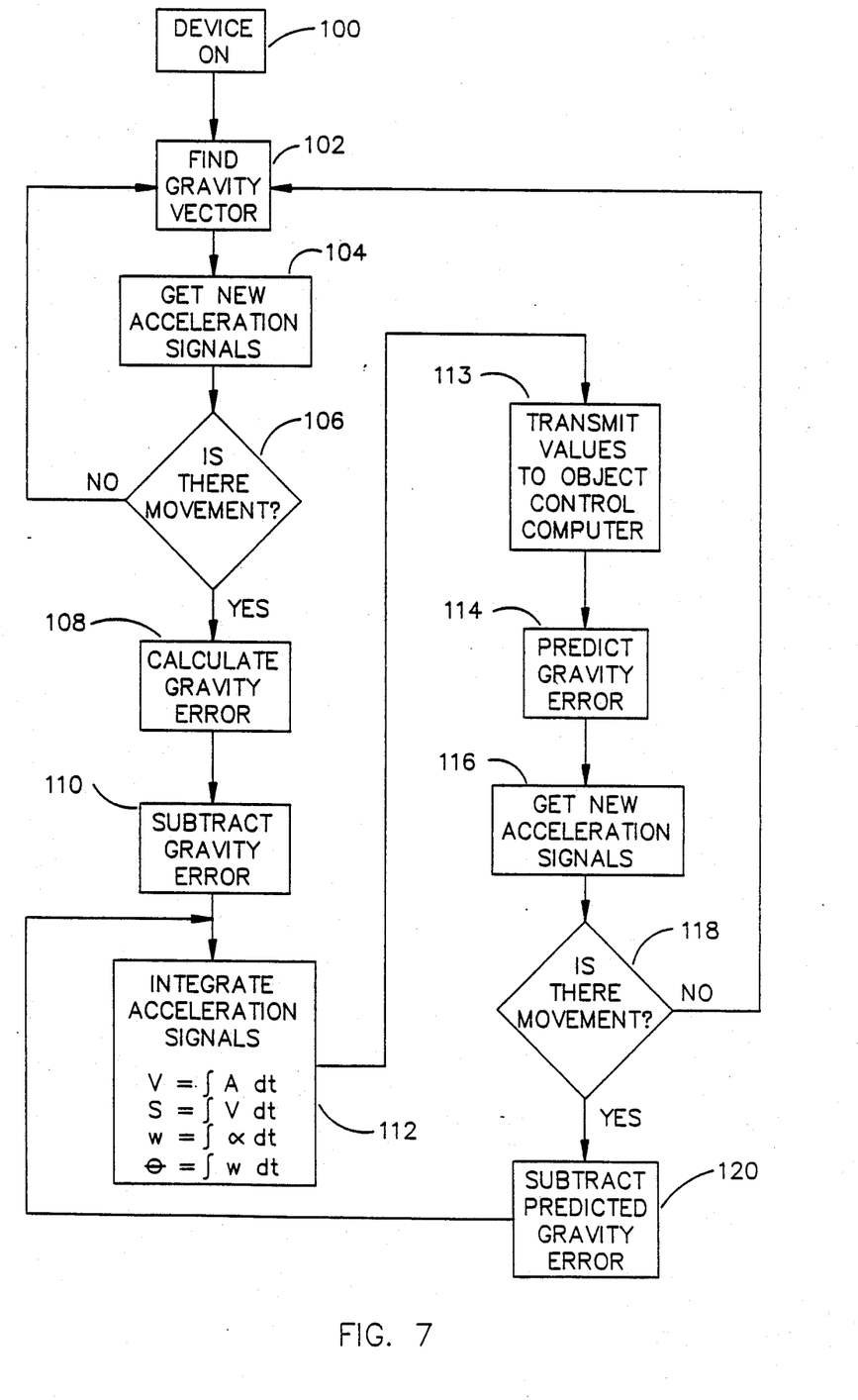
FIG. 7 is a flow chart of portions of the operating sequences of a spatial input device and system according to the present invention.

If there was movement of the handheld module H, control passes to step 108 where the preprocessing computer 40 calculates the error due to gravity of the various acceleration signals based on the initial resting position of the module H, which errors are then subtracted in step 110 to determine the actual acceleration signals developed by the user. Only after the module H is moving are the predicted gravity vector equations used. These acceleration signals are then integrated as appropriate in step 112 to produce the various velocity and position signals. The time intervals used in the integration process need not be uniform, just determinable.

After the integration step is completed, the preprocessor 40 transmits the acceleration, position and velocity values to the object control computer 42 in step 113. After transmitting the various values in step 113, the preprocessor computer 40 predicts the gravity error of the acceleration signals in step 114. In step 116, a set of uncorrected acceleration signals is obtained from the accelerometers and in step 118 these values are evaluated to determine if the handheld module H is still moving. If there is no movement, control is returned to step 102 for a redetermination of the gravity force vectors and inclination to reduce the effects of gravity vector prediction and integration errors. If there is still movement, the predicted gravity vector or error is removed from the acceleration signals in step 120 and control is returned to step 112 for integration.

It is envisioned, although not described in detail, that other interactions between module H are the object control computer 44 may be desired. To suit these other purposes, the various buttons 22-28 on the module H or keys on the keyboard K could be utilized for example to indicate that only values along a single axis of movement or two dimensional inputs while the module H is not resting on a surface are to be used by the object control computer 44 in its calculations and processing. Other such variations could be readily accommodated by providing appropriate conventional signal sources such as switches or the like to limit or modify the type of orientation data provided by the module H.

The foregoing disclosure and description of the invention are illustrative and explanatory thereof, and various changes in size, shape, materials, components, circuit elements, wiring connections, contacts and program sequences as well as in the details of the illustrated circuitry and construction may be made without departing from the spirit of the invention.

We claim:

1. An apparatus for providing spatial orientation data signals, comprising:
   an inertial platform accelerometer cluster having three orthogonal axes and a plurality of accelerometers arranged to provide signals indicative of linear acceleration of said platform along each of the three axes and rotational acceleration of said platform about each of the three axes, said accelerometers all having their centers of measurement coplanar;
   processing means for receiving said accelerometer signals and providing output signals representative of linear acceleration along each of the three axes and rotational acceleration about each of the three axes.

2. The apparatus of claim 1, wherein said processing means further provides output signals indicative of the linear and rotational velocities relative to each of the three axes, and the instantaneous linear and rotational positions of the apparatus.

3. The apparatus of claim 1, further comprising:
   housing means for containing said accelerometer cluster; and
   switch means operated by the user to provide a switch closure signal to said processing means.

4. The apparatus of claim 3, further comprising:
   pointer means for tracing the shape of an object, said pointer means having a tip for contacting the contour of the object to be digitized, said pointer tip being mounted with said housing means in a defined spatial relationship thereto to provide a means for indicating a point remote from said cluster center.

5. The apparatus of claim 1, further comprising:
   resting switch means for providing a signal indicative of when said accelerometer cluster is resting on a surface.

6. A system for controlling the movement of an object in response to directional control signals, comprising:
   an inertial platform means for manipulation by the user to indicate the desired movement of the object, said inertial platform means including a plurality of accelerometers for sensing movements o the platform by the user along each of three orthogonal axes and means for providing directional control signals indicative of the linear accelerations along each of the three axes and the rotational accelerations about each of the three axes;
   means for receiving said directional control signals;
   means for controlling the movement of the object responsive to said directional control signals thereby causing the object to mimic the movement of said inertial platform.

7. The object control system of claim 6, wherein the object is a cursor represented on a graphic display device and said control means includes means for controlling movement of a cursor on a graphic display device.

8. The object control system of claim 6, wherein the object is a representation of a physical object on a graphic display device and said control means includes means for controlling the movement of a physical object displayed on a graphic display device.

9. The object control system of claim 6, wherein the object is a remote manipulator, and said control means includes means for controlling the movement of a remote manipulator.

10. The object control system of claim 6, further comprising:
    housing means for containing said inertial platform means; and
    switch means operated by the user to provide a switch closure signal to said control means.

11. The object control system of claim 6, wherein said control means includes means for limiting the movement of the object to translation along each of two axes and rotation about the third axis.

12. A system for digitizing a three-dimensional surface, comprising:
    an inertial platform means for manipulation by the user to indicate the desired position to be digitized, said inertial platform means includes a plurality of accelerometers for sensing movements of the platform by the user along each of three orthogonal axes and means for providing directional signals indicative of the linear accelerations along each of the three axes and the rotational accelerations about each of the three axes;
    processing means for receiving said directional signals and providing signals indicative of the linear and rotational position of said inertial platform means; and
    means for storing a plurality of said linear position signals and for developing a three dimensional representation of the stored positions.

13. The digitizing system of claim 12, further comprising:
    housing means for containing said inertial platform means;
    switch means operated by the user to provide a switch closure signal to said control means to indicate selection of position signals to be stored by said storage means.

14. The digitizing system of claim 13, further comprising:
    pointer means for tracing the shape of an object, said pointer means having a tip for contacting the contour of the object to be digitized, said pointer tip being mounted with said housing means in a defined spatial relationship thereto to provide a means for indicating a point remote from said inertial platform means center; and
    interpretation means for translating said inertial platform means position location and rotation signals to indicate the position of said pointer tip for storage by said storage means.

15. The digitizing system of claim 14, further comprising:
    means for determining the location of said pointer tip with relation to said inertial platform means.

16. The digitizing system of claim 13, further comprising:
   crosshair means for digitizing a two dimensional surface, said crosshair means being mounted with said housing means in a defined spatial relationship to provide a means for indicating a point remote from said inertial platform means center when said inertial platform means is resting on a flat surface.

* * * * *